(12) United States Patent
Caristan

(10) Patent No.: US 8,367,969 B2
(45) Date of Patent: Feb. 5, 2013

(54) SUPPORT TABLE FRAME FOR HIGH SPEED LASER BLANKING

(75) Inventor: Charles L. Caristan, Houston, TX (US)

(73) Assignee: Air Liquide Industrial U.S. LP, Houston, TX (US)

( * ) Notice: Subject to any disclaimer, the term of this patent is extended or adjusted under 35 U.S.C. 154(b) by 543 days.

(21) Appl. No.: 12/619,848

(22) Filed: Nov. 17, 2009

(65) Prior Publication Data

US 2010/0122970 A1    May 20, 2010

Related U.S. Application Data

(60) Provisional application No. 61/115,731, filed on Nov. 18, 2008.

(51) Int. Cl.
*B23K 26/00* (2006.01)
*B23K 26/14* (2006.01)

(52) U.S. Cl. ......... 219/121.67; 219/121.72; 219/121.82; 269/21; 269/289 R

(58) Field of Classification Search ............. 219/121.67, 219/121.72, 121.82; 269/21, 289 R
See application file for complete search history.

(56) References Cited

U.S. PATENT DOCUMENTS

| | | | | |
|---|---|---|---|---|
| 3,736,402 A | * | 5/1973 | Mefferd et al. | 219/121.67 |
| 4,039,799 A | * | 8/1977 | Stumpf | 219/121.67 |
| 4,335,296 A | * | 6/1982 | Bredow | 219/121.67 |
| 4,796,341 A | | 1/1989 | Kuhn, II | |
| 5,139,245 A | | 8/1992 | Bruns et al. | |
| 5,182,428 A | * | 1/1993 | Jack et al. | 219/121.63 |
| 5,341,717 A | | 8/1994 | Feldman | |
| 5,632,915 A | * | 5/1997 | Schnetzer et al. | 219/121.82 |
| 5,758,869 A | | 6/1998 | Redeker | |
| 5,854,460 A | * | 12/1998 | Graf et al. | 219/121.67 |
| 6,310,317 B1 | | 10/2001 | Remue | |
| 6,563,081 B2 | * | 5/2003 | Pace | 219/121.72 |
| 6,666,063 B2 | | 12/2003 | Pick et al. | |
| 6,710,291 B1 | | 3/2004 | Wegener et al. | |
| 7,148,446 B2 | * | 12/2006 | Harnisch et al. | 219/121.67 |
| 2003/0034336 A1 | * | 2/2003 | Erlenmaier et al. | 219/121.67 |
| 2003/0116543 A1 | * | 6/2003 | Battaglia | 219/121.67 |
| 2004/0108305 A1 | * | 6/2004 | Harnisch et al. | 219/121.72 |
| 2009/0212033 A1 | | 8/2009 | Beck et al. | |
| 2010/0057794 A1 | * | 3/2010 | Schwaab et al. | 707/645 |
| 2010/0057798 A1 | * | 3/2010 | Zhang et al. | 707/722 |

FOREIGN PATENT DOCUMENTS

| | | |
|---|---|---|
| DE | 10019368 | 10/2001 |
| DE | 20319159 | 3/2004 |
| EP | 0248715 | 12/1987 |
| EP | 0461064 | 12/1991 |
| EP | 1002595 | 5/2000 |
| EP | 1238746 | 9/2002 |

OTHER PUBLICATIONS

Search Report for PCT/EP2009/064803, Feb. 23, 2010, 2 pages.
Search Report for PCT/EP2009/064815, Feb. 12, 2010, 2 pages.
Caristan, Charles; Altan, Taylan; Kaya, Serhat, "Design for Laserfacturing" IABC 2007.

(Continued)

*Primary Examiner* — Mary Wilczewski
(74) *Attorney, Agent, or Firm* — Elwood L. Haynes

(57) ABSTRACT

The present invention provides an apparatus for laser cutting that comprises a rigid support table frame having a X-axis and a Y-axis, and one or more bridge rail modules running across the Y-axis of the table frame, each bridge rail module comprising at least one hold-down device module. The present invention further provides a process for laser cutting a metal plate using this apparatus.

24 Claims, 9 Drawing Sheets

OTHER PUBLICATIONS

Finn, Jay; Caristan, Charles, "Lightening up the Infrastructure of Blanking—Today's Viability of Continuous Coil Fed Laser Blanking", LaserCoil Brochure, Napoleon, Ohio, Jun. 2009.

Caristan, Charles; Mohiuddin, Gulam; Forrest, Mariana; Uddin, Nasim, "Product Design Guidelines for Manufacturing with Industrial Lasers", IABC 2006 International Automotive Body Congress, www.bodycongress.org., pp. 24-29.

"New Cost Advantages for Laser Blanking for Automotive Applications", WELTRAX, www.laserglobalservices.com, Mar. 29, 2006.

Caristan, Charles; Bridge, Charlie; Maynard, Steve, "Fiber Laser Cutting & Welding at Extreme Power—Extreme Speed", ALAC 2008 Conference, Minneapolis, MN, Sep. 2008.

Caristan, Charles; Finn, Jay, "Fiber Laser Blanking of Coil Strips at Extreme Speed-Extreme Power", International Conference on Applications of Lasers and Electro-Optics (ICALEO), Orlando, FL, Nov. 2009.

Stevens, Mark W., "Automotive Laser Applications" Automotive Laser Application Workshop, Detroit MI, Mar. 15, 2000.

Norlung, Olof, "Technical and Economical Optimisation of High Speed Laser Blanking in High Variant Electrical Machine Production" Lulea Tekniska University, http://epubl.luth.se/1402-1617/2001/169/.

Penn, Wayne et al., "Precision Cutting and Welding with Fiber Laser", Advanced Laser Applications Conference, 2004.

\* cited by examiner

SUPPORT TABLE FRAME FOR HIGH SPEED LASER BLANKING

CROSS-REFERENCE TO RELATED APPLICATIONS

This application claims the benefit of U.S. Provisional Application No. 61/115,731, filed Nov. 18, 2008, the entire contents of which are incorporated herein by reference.

FIELD OF THE INVENTION

The present invention relates to a holding apparatus to be used for high speed laser blanking.

BACKGROUND OF THE INVENTION

FIG. 1 illustrates a traditional grid table that is used for laser cutting operations. The grids 9 which provide toothed bridges for the blank support that sits across the table, are consumable structures and act only as a bottom support for the blank parts. Other than by the weight of the workpiece and the friction force on the teeth of the grid table, such prior art grids 9 do not hold the material down and in place during the actual cutting of the flat metal plate 10 along the cutting line 11 as the metal plate 10 progresses along the path of cutting 12, as shown in FIG. 2. This can lead to cutting and/or quality issues when, for instance, the material's surface moves during cutting due to residual stress, or mechanical stress and/or thermal stress induced in the material during the actual cutting. Furthermore, the teeth of the support-grid structure are sometimes on the cutting path of the laser beam. As a result, this can sometimes yield cutting quality defects such as burr, dross, loss of cut, gouging, etc. Accordingly, there is a need to provide a support table frame that overcomes these problems encountered in laser cutting operations.

SUMMARY OF THE INVENTION

The present invention provides for a heavy duty rigid holding apparatus (of X-Y axis) for high speed laser blanking operations, in particular laser cutting, that comprises a table frame, one or more bridge rail modules running across the Y-axis of the table frame, each bridge rail module equipped with one or more (preferably several) hold down device modules that can provide hold down force on blanks through the use of suction or magnetic force. For the suction mechanism, these hold down device modules are used for creating a vacuum, i.e. a pressure less than the pressure of the surrounding atmosphere, between the hold-down devices and the surface of the material to be cut, and thus firmly hold the workpiece to be cut in a stationary position during the cutting. For the magnetic mechanism, the hold-down device modules are equipped with magnets or electro-magnets that can be actuated to exert hold down force on the peripheral blank.

DETAILED DESCRIPTION OF THE INVENTION

The present invention provides a holding apparatus for laser cutting. This holding apparatus comprises a rigid support table frame having an X-axis and an Y-axis, and one or more bridge rail modules running across the Y-axis or X axis of the table frame 13. Each of the bridge rail modules utilized comprises at least one hold-down device module.

Figure 3:
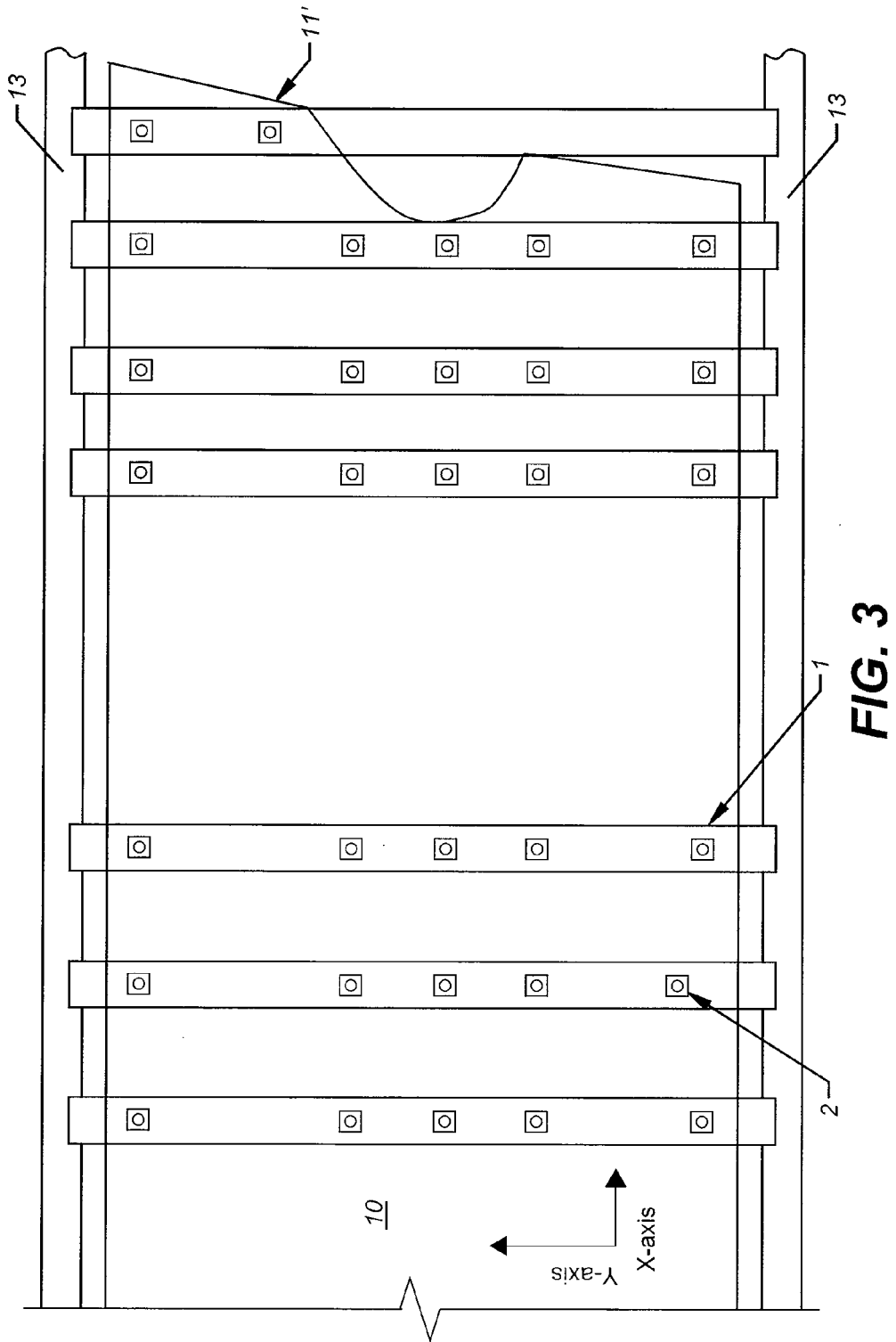
FIG. 3 illustrates a top view of a metal plate unwound from a coil progression, stationary relative to the holding apparatus according to the present invention prior to the start of the next cut.
Figure 4:
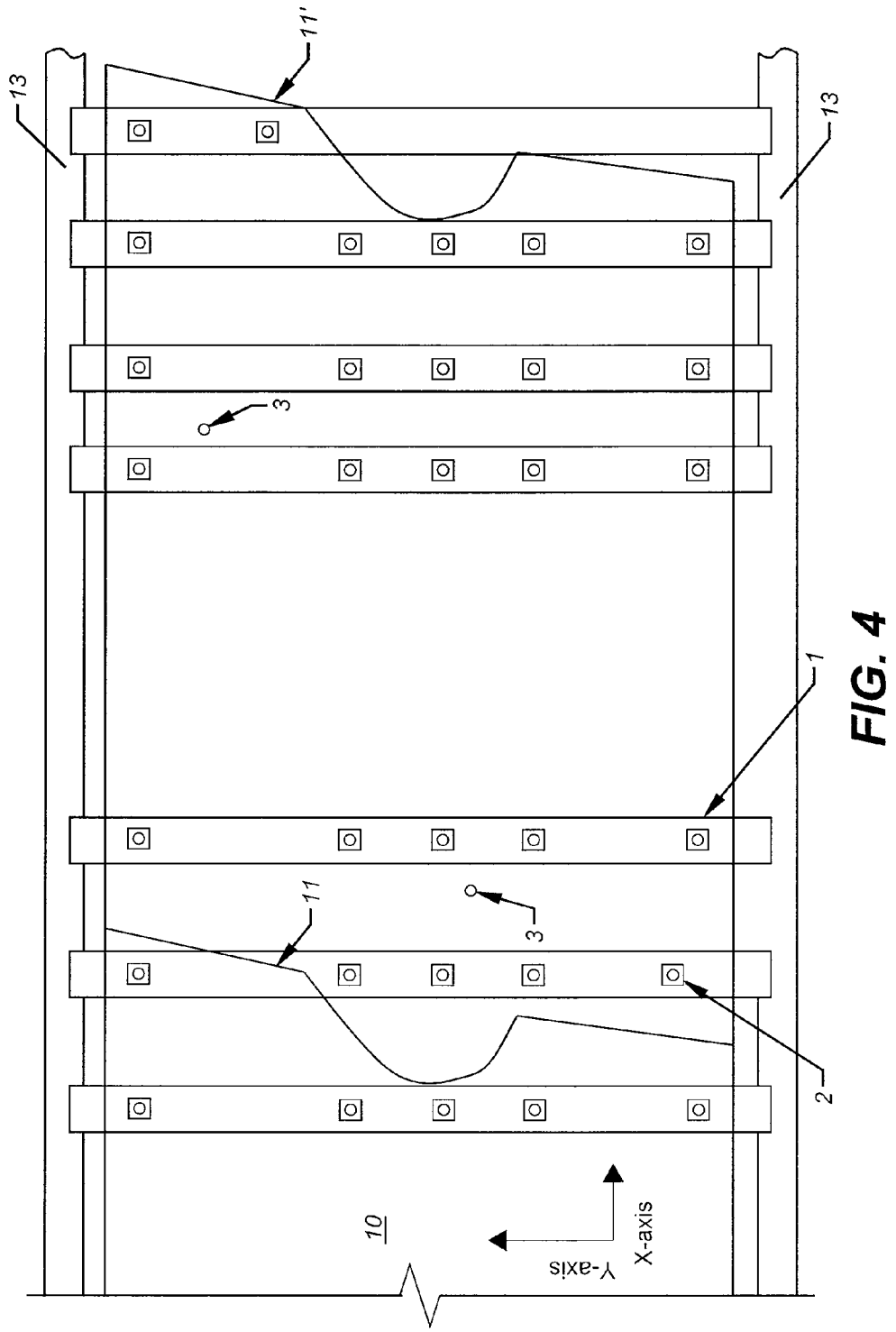
FIG. 4 illustrates the same view as FIG. 3 but after the end of a new cutting line and cut of reference locator features.

Further reference is made to the figures of the present invention with regard to describing the present invention. FIGS. 3 and 4 represent a top view of a metal plate 10 (coil, also referred to herein as "workpiece") disposed on a holding apparatus according to one embodiment of the present invention that comprises a table frame 13, seven bridge rail modules 1, with each of the bridge rail modules 1 comprising from two to five hold-down device modules 2 for a total of thirty-two hold-down device modules 2. Those of ordinary skill in the art will recognize that the number of hold-down device modules 2 utilized can vary; can be greater than or less than two to five per hold down device module 2 (or a total of thirty-two). Those of ordinary skill in the art will also recognize that the number of bridge rail modules 1 utilized can vary; can be greater than or less than seven. Preferably, the number of bridge rail modules 1 is from 1 to 20 and preferably the number of hold down device modules is from 1 to 20. When using more than one bridge rail module 1, the bridge rail modules 1 are preferably parallel to one another. However, the orientation of the bridge rail modules 1 with regard to one another can vary and accordingly can be designed in different orientations with respect to the X-axis and Y-axis direction. For example, the orientation of the bridge rail modules 1 can be anywhere between parallel and perpendicular to the X-axis to accommodate a particularly intricate nesting pattern. After adjusting their position and orientation with respect to the X-axis and Y-axis, the one or more bridge rail modules 1 are fixed in position (means not shown) on the engineered table frame 13 before the workpiece 10 to be cut is brought on it. With regard to the term "fixed" it is meant that the one or more bridge rail modules 1 are attached to the engineered table frame 13 such that the one or more bridge rail modules 1 do not move during the actual cutting of the workpiece 10, the one or more bridge rail modules 1 remain in a stationary position. Note that while the terms "fixed" and "attached" are used herein, the actual fixing and attachment is not permanent. Accordingly, those of ordinary skill in the art will recognize that a variety of means may be used to affix or attach the one or more bridge rail modules 1 to the engineered table frame 13 during the actual cutting of the workpiece 10 (such as through the use of screws, bolts, brackets, etc). More specifically, with regard to the present invention, in one alternative, at least one of the bridge rail modules 1 spans in size across at least a portion of the entire table frame 13 surface envelop. In another alternative, the bridge rail modules 1 are anchored securely on at least one edge of the table frame 13. In still another alternative, the bridge rail modules 1 are anchored securely on at least two edges of the table frame 13.

Figure 1:
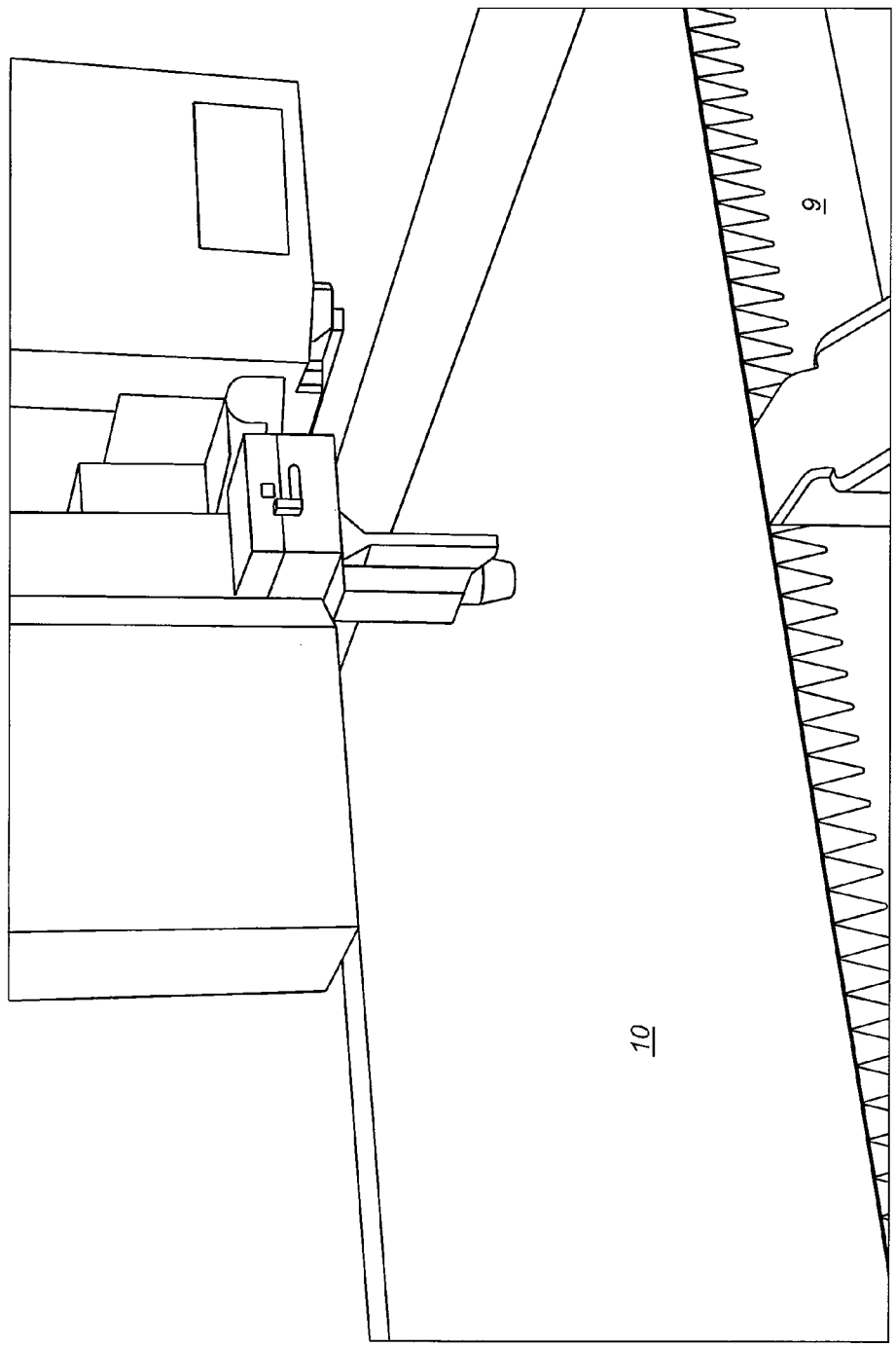
FIG. 1 illustrates a prior art grid table that is used for laser cutting operations.
Figure 2:
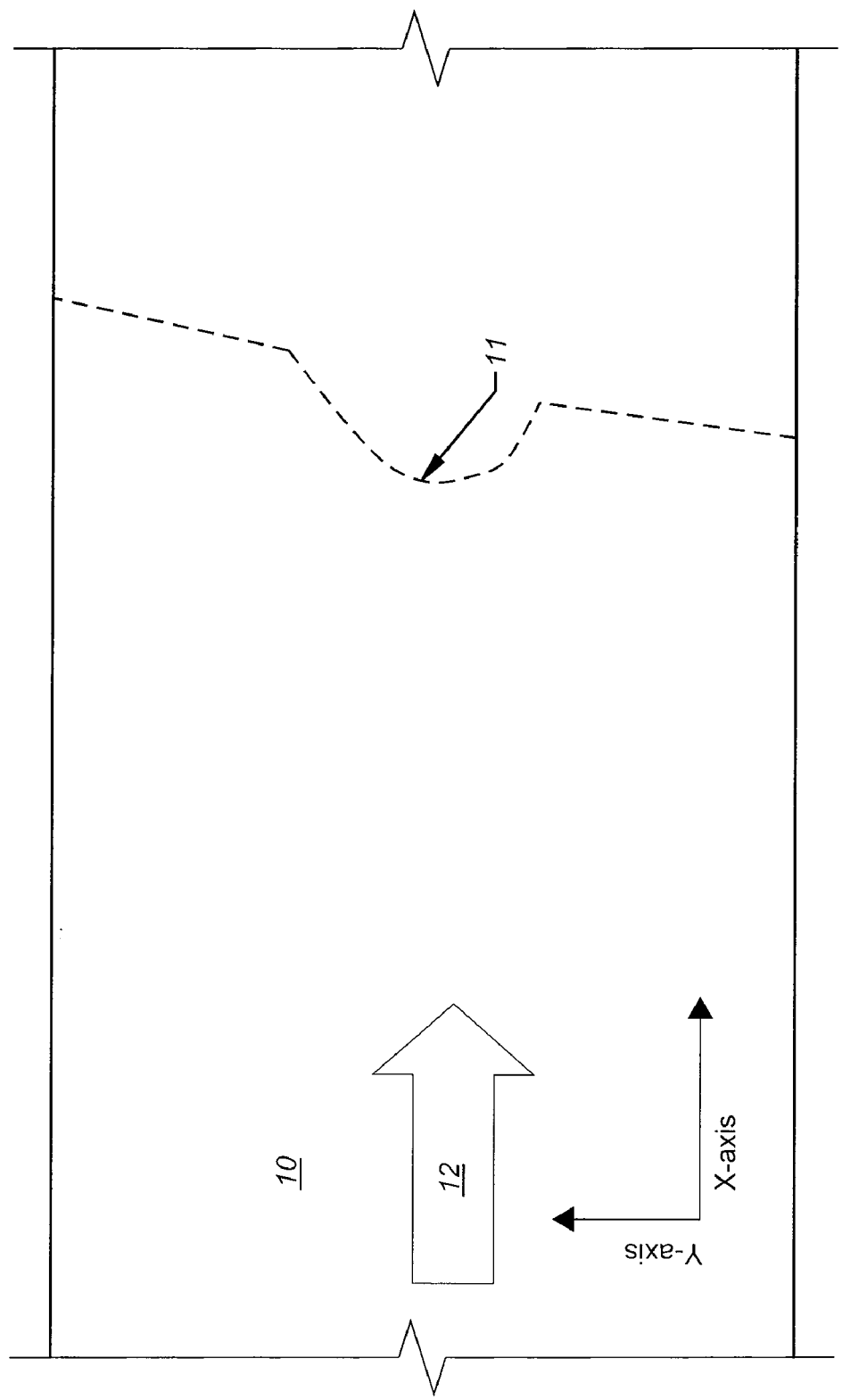
FIG. 2 illustrates a coil progressing immediately after the previous line has been cut.

Once the workpiece 10 is in a stationary position, the hold down device modules 2 are activated to exert hold down force on the material to be cut to keep it stationary during cutting. Further reference is made to prior art reference FIG. 1 and present invention FIGS. 3 and 4 which each show an example of a continuous coil feed presenting a workpiece 10 progression above the holding apparatus. The workpiece 10 is stopped periodically at the end of each progression. Alternatively, this holding apparatus is used on a laser cutting machine fed with precut peripheral blanks 4, and the peripheral blanks 4 are put in position and orientation by robotic handling mechanism (not shown).

In FIG. 3 of the present invention, the bridge rail modules 1 of the holding apparatus are shown in position immediately before the start of a cut 11. Further reference to FIG. 4 shows the same view immediately after the end of a new cutting line 11' and cut reference locator features 3. To enable feed and stop periodic motion of such a workpiece 10, a coil retardation loop (motion mechanism) can be put in place. Those of ordinary skill in the art will recognize that any coil retardation loop such as those utilized in standard continuous coil die-blanking operations can be utilized in the present invention. With regard to FIG. 4, the laser cut has been carried out in the flat metal plate 10 (coil) between two successive bridge rail modules 1. Furthermore, two reference locator features 3 (see also FIG. 5) have also been cut through the metal plate 10 forming the peripheral blank 4. Reference locators holes 3 can actually also be any feature different in structure from a hole and are used to position and orient the peripheral blank 4 in subsequent downstream fabrication operation such as stamping, welding and even further laser cutting of the peripheral blank 4.

Figure 5:
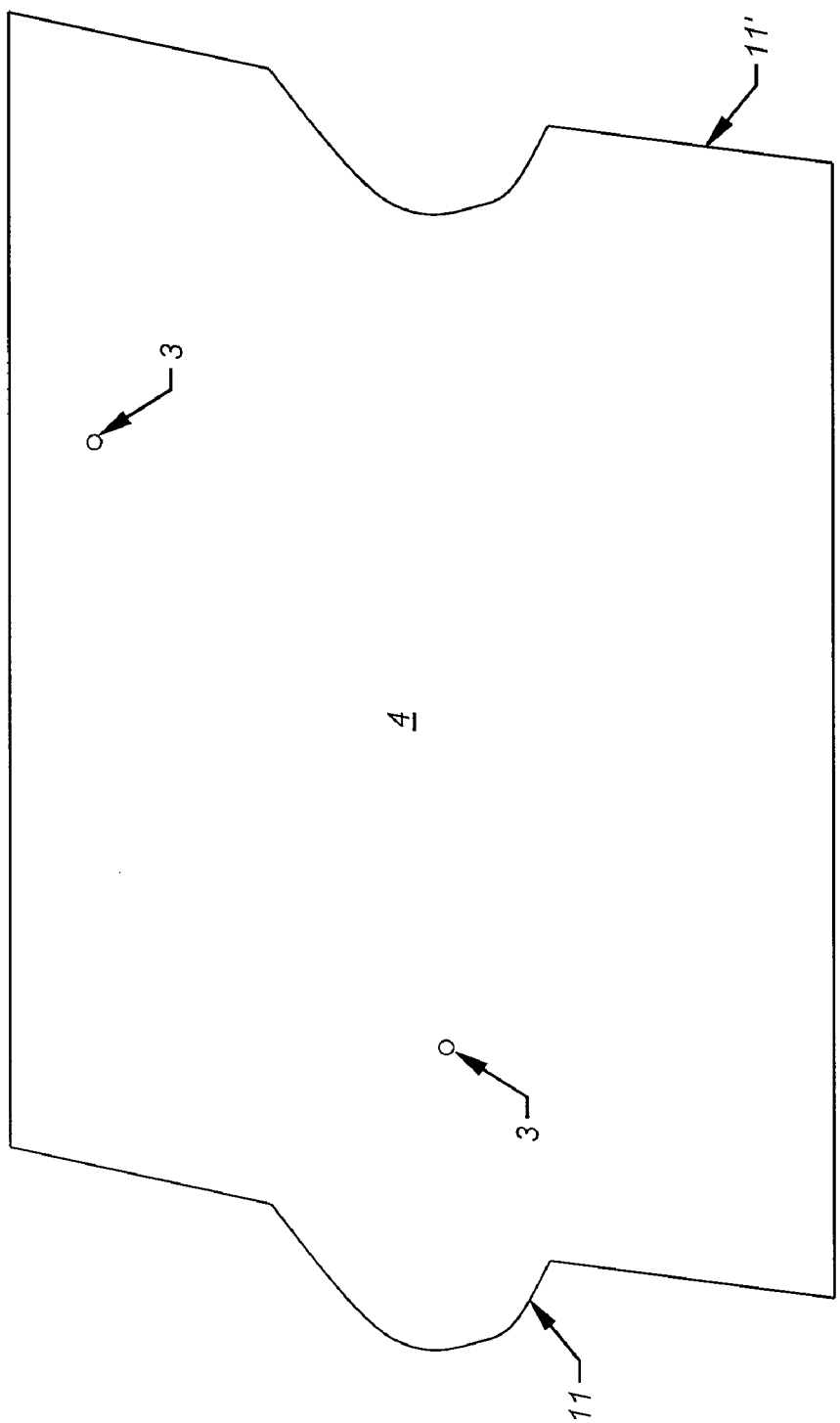
FIG. 5 illustrates the peripheral blank obtained after the laser cutting operation of FIG. 4, showing the previous cutting line, the newly finished cutting line, and the two reference locator features.

FIG. 5 shows the peripheral blank 4 obtained after the laser cutting operation of FIG. 4 and removal from the holding apparatus. This peripheral blank 4 has been laser cut at its ends along desired cutting lines (11, 11'). Cutting lines 11 and 11' have been obtained during two successive cuts, respectively, as illustrated in FIGS. 3 and 4, and explained hereinbefore. The peripheral blank 4 further comprises the two reference locator features 3 which are represented by holes. Those of ordinary skill in the art will recognize that the number of reference locator features 3 can be greater or less than two and can include any structural feature different from a hole.

Rather than utilize the traditional grid 9 of consumable toothed bar bridges, the present invention provides a heavy duty universal flexible engineered table frame 13 that not only provides the minimum material support necessary for a laser-cutting machine (even if not optionally equipped with a height sensor closed-loop profiling) but also means for holding the material to be cut in place during cutting. The frame 13 of the table should be of heavy duty construction. The engineered table frame 13 should have one or more X-axis guides along at least one X-axis side. In addition, the engineered table frame 13 should be constructed of such a material as to allow the table to sustain direct or reflected laser irradiation without suffering from excessive heat distortion. Accordingly, while not intending to be limiting with regard to the present invention, typically the engineered table frame 13 will be constructed mainly of fabricated steel or aluminum structures, and/or casting have copper elements; any elements could even be cooled with coolant fluid such as water or any other coolant fluid to further increase its life between maintenance and repair schedules. If desirable, the bridge rail modules 1 can have any orientation including parallel and perpendicular to either the X axis or Y axis and any orientation in between. In addition, the bridge rail modules 1 can be fabricated of the same material as the table frame 13.

The holding apparatus will include one or more bridge rail modules 1 running across the Y-axis (parallel to the Y-axis or otherwise) of the table frame 13. These bridge rail modules 1 are position adjustable or even slidable along the X-axis and/or Y-axis rails of the table frame 13 to allow for positioning anywhere along the X-axis and/or Y-axis of the table frame 13. Each bridge rail module 1 can easily be removed from the table frame 13 for cleaning and/or maintenance and set-up. These bridge rail modules 1 are heavy duty rigid structures that should be designed as narrow as possible so that detached scrap parts can fall through and be collected by a scrap conveyor underneath the table. If necessary or desirable, in an alternative embodiment of the present invention, the part program may add additional cut sequences in order to cut the engineering scrap into smaller pieces that can easily fall through the grid 9 of bridge rail modules 1 for evacuation and collection. The bridge rail modules 1 may also include channels for an optional cooling fluid system; cooling fluid can include any liquid such as for example water based coolant or other liquid refrigerant, or gaseous cooling fluid flow. In a still alternative embodiment, the engineered scrap pieces that do not fall through the grid 9 of bridge rail modules 1 can be evacuated and collected utilizing different pre-engineered means such as robotic handling.

Figure 6:
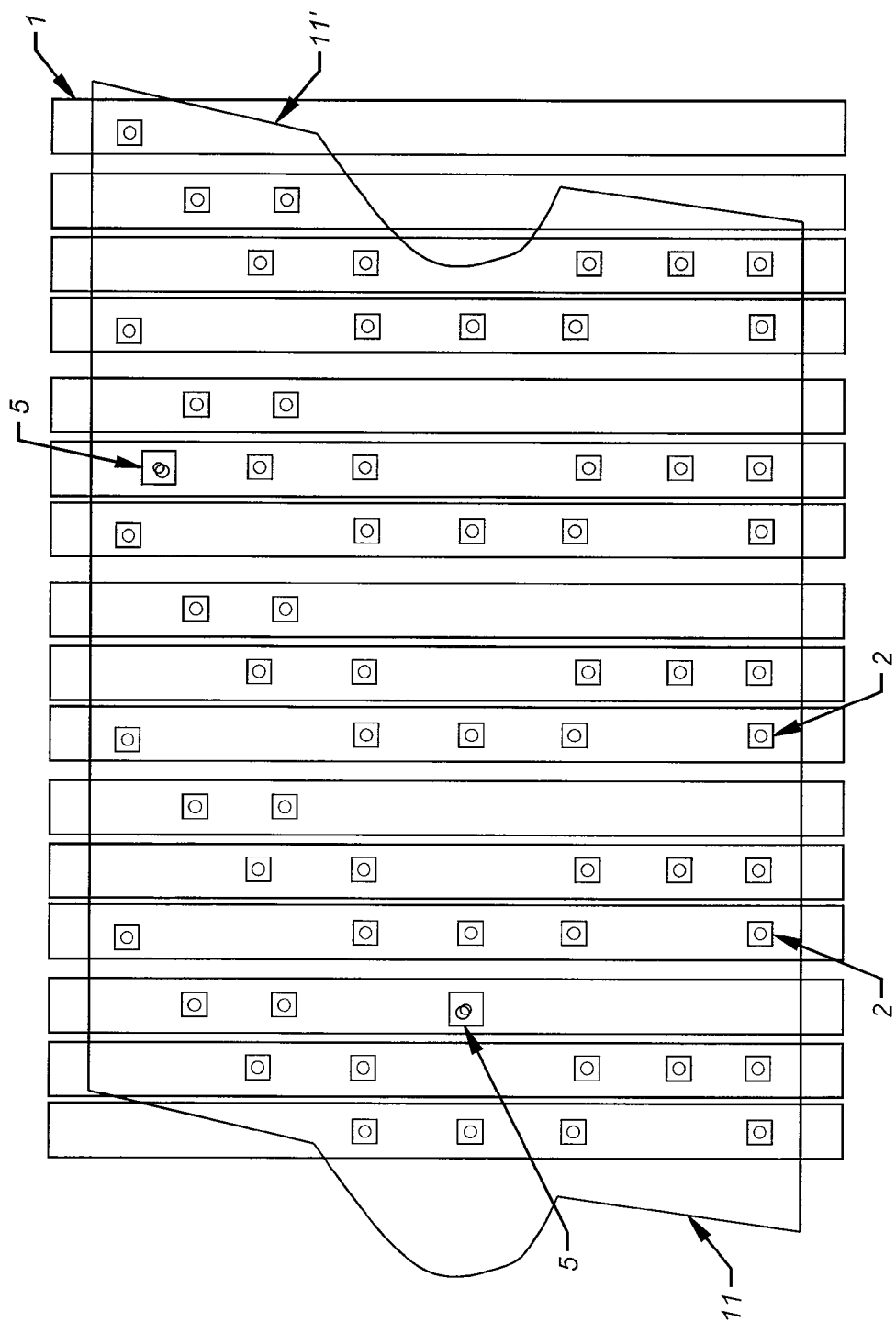
FIG. 6 illustrates the peripheral blank detached from the coil-feed station before it is further cut into several final smaller blank pieces.

As shown in FIG. 6, each bridge rail module 1 comprises heavy duty hold down device modules 2 and pin location modules 5 that are position-adjustable or even slidable along the bridge rail module 1. The number of hold down device modules 2 and pin location modules 5 utilized will vary depending upon the nesting and the size of the workpiece being utilized. Accordingly, as many hold down device modules 2 and pin location modules 5 as needed can be used as along as they can spatially fit in a given bridge rail module 1. In one particular embodiment, more than one hold-down device module 2 will be present on the bridge rail module 1. The word "rail" as used herein, includes any structure of any type, shape, size or form that can span across any two edges of the table frame 13, or even that can be positioned and secured from just any one edge of the table frame 13 without necessarily bridging on a second edge of the table frame 13. In some embodiments, a single bridge rail module 1 can have the size to span over all or at least partially across the work surface envelope of the table frame 13.

The engineered table frame 13, bridge rail modules 1 and hold-down hold down device modules 2 have adequate machined surfaces that can be flat or not in order to provide local part support and also have suction or magnetic force which provides the equivalent of clamping tension to hold the material to be cut in place, i.e. the metal plate 10 to be cut, including providing tension in spaces between hold-down device modules 2. The support surfaces of these hold down device modules 2 also serve as reference height surface for the peripheral blanks 4 that can rest on them. The support surfaces are elevated with respect to the surface of the bridge rail module 1. Alternatively these support surfaces on which metal plate 10 or peripheral blank 4 will rest during cutting can be separate from the hold-down device modules 2.

Figure 7:
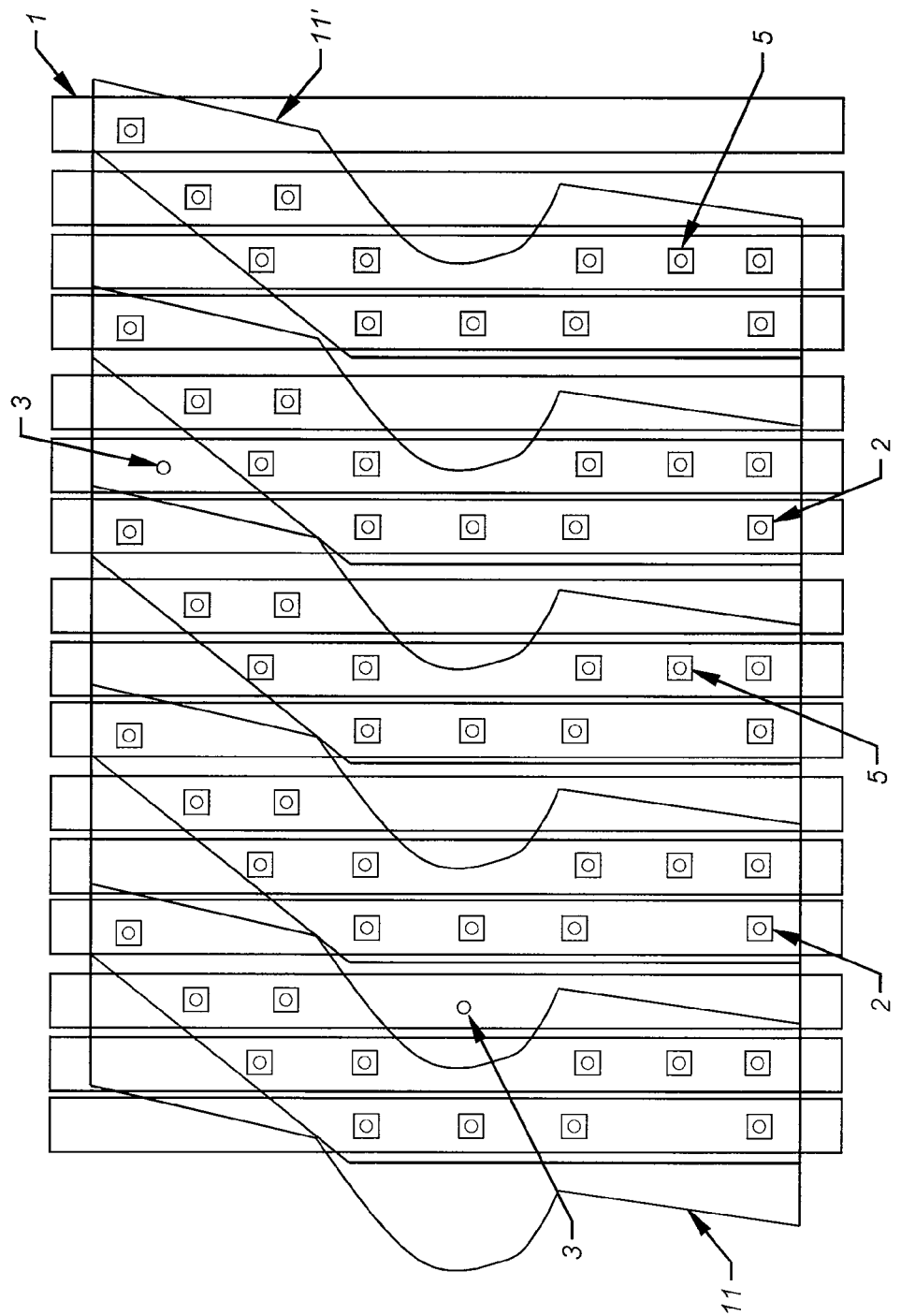
FIG. 7 illustrates the position of the smaller blank pieces cut in the peripheral blank.

FIGS. 6 and 7 show another embodiment of the present invention, wherein some of the bridge rail modules 1 include pin location modules 5 that are used for detecting/locating the reference locator features 3 that have been pierced through the metal plate 10 forming the peripheral blank 4 as explained hereinbefore.

FIGS. 5 and 6 represent the peripheral blank 4 detached from the coil-feed station 7 and before it is further cut into a multitude of smaller blank pieces 6, whereas FIG. 7 represents the position of the multitude of smaller blank pieces 6 cut in the peripheral blank 4. These hold down device modules 2 and pin location modules 5 are located strategically as a function of the nesting and of the part programmed path 12 of the laser cutting head 14 (not shown). The path 12 of the cutting focusing laser head 14 should preferably not go across or above a hold down device modules 2 when the laser is on. This helps prevent the parts from tipping over without falling and also the parts from sticking out as a collision object on the path 12 of the cutting head. This also reduces material moving from its position induced by heat input thermal displacements or residual stress spring back which could lead to parts being cut out of dimensional accuracy tolerances.

For purposes of cleaning, maintenance or repair purposes, these hold down device modules 2 and pin location modules 5 should be easy to change. The entire holding apparatus is rigid and can be leveled at installation so that all hold-down device module 2 surfaces are at the same reference height surface on which the peripheral blank 4 rests. Small height changes are acceptable on the work envelope as long as they do not scratch the workpiece, nor permanently deform it, and as long as the slope of height difference does not exceed 0.5 mm per 20 mm travel across the work envelope, or preferably 2.0 mm per 20 mm travel across the work envelope.

Figure 8B:
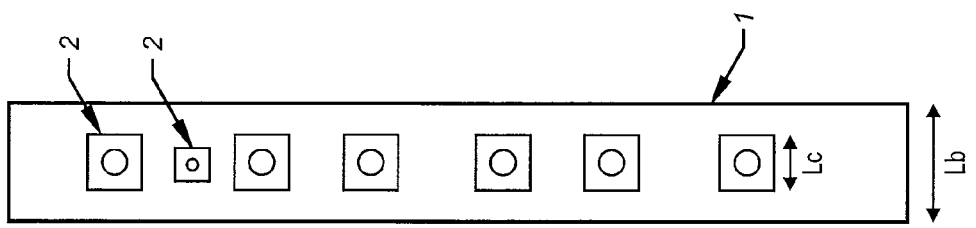
FIG. 8B illustrates that each bridge rail module must be rigid as it will serve as a reference height surface.
Figure 8A:
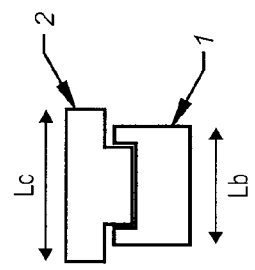
FIG. 8A illustrates that all elements of the hold down device modules are machined to present a leveled reference surface of the hold-down device modules upon which the workpiece rests under hold down.

As illustrated in FIG. 8A, all elements of the hold down device modules 2 are preferably machined to present a leveled reference surface of the hold-down device module 2 upon which the workpiece rests under hold down force. The hold down device modules 2 utilized may be of any shape or size provided that the hold down device modules 2 are able to hold down the surface of the workpiece 10 to be cut. The hold down device modules 2 can be circular, oval, square, or any adequate shape such as a cup and have a width Lc. Quick disconnects for compressed gas or air feed and return are an option. In addition, the material that the hold down device modules 2 are made out of is not critical provided that the material is of a nature that can allow the induction of suction force or alternatively of magnetic force to the surface of the workpiece to be cut and is capable of holding this force during the actual cutting procedure. While those of ordinary skill in the art will recognize that a variety of materials meet this criteria, the preferred materials for which the hold down device modules 2 will be fabricated from include, but are not limited to, rubber, plastic coated metals, wood or any other material that will not scratch the workpiece. In addition, it should be noted that in one embodiment of the present invention, the position of each hold down device module 2 on the bridge rail module 1 is adjustable before and after the cutting of the workpiece 10. In this first embodiment, the position is such that the hold down device modules 2 are not along the path of the laser cutting head 14 during cutting. In addition, in an alternative embodiment, the position of each hold down device module 2 on the bridge rail module 1 is firmly secured during cutting according to a pattern optimized based on each cutting nesting pattern. In this second embodiment, the position is such that the hold down device modules 2 are not at the same position at the same time during cutting.

The hold down device modules 2 can be in fluid connection with at least a vacuum source, such as a vacuum pump or any other vacuum device able to create an under-pressure (i.e. a pressure less than the pressure of the surrounding atmosphere (<1 atm)) and to thus obtain a suction effect in the hold-down device modules 2 (such as a hold down cup) thereby allowing a firm holding of the workpiece to be cut. Alternatively to using a vacuum pump, Venturi effect type under pressure hold down device modules 2 can be utilized. Alternatively to suction force, hold down device modules 2 can be magnets or electromagnets that when actuated generate sufficient magnetic force that can be used as hold-down or clamping tension force directly or indirectly on the workpiece 10 during cutting. Accordingly, in such embodiments, the at least one hold-down device module 2 is a device that can be actuated to exert a magnetic force to hold down the workpiece 10 directly if the workpiece is made at least partially of magnetic material or indirectly if the workpiece is not made at least partially of magnetic material. Such modules 2 may also be in any form or shape.

As illustrated in FIG. 8B, each bridge rail module 1 must be rigid as it will serve as a reference height surface. The bridge rail module 1 must also be heavy duty and easy to clean for purposes of maintenance. The width Lc of the hold-down device module 2 reference surface can be either smaller than or larger than the width (or diameter if cylindrical) Lb of the bridge rail module 1. On a holding apparatus, hold down device modules 2 can have different sizes and shapes but should be set up such that all present adequate reference surface position (s) upon which the blank rests. While, in most cases, the holding apparatus presents the workpiece 10 in a horizontal position, during cutting, alternatively, the present invention includes set ups in which the holding apparatus can present the workpiece 10 surface in a non-horizontal position or even a vertical position during laser cutting.

Figure 9:
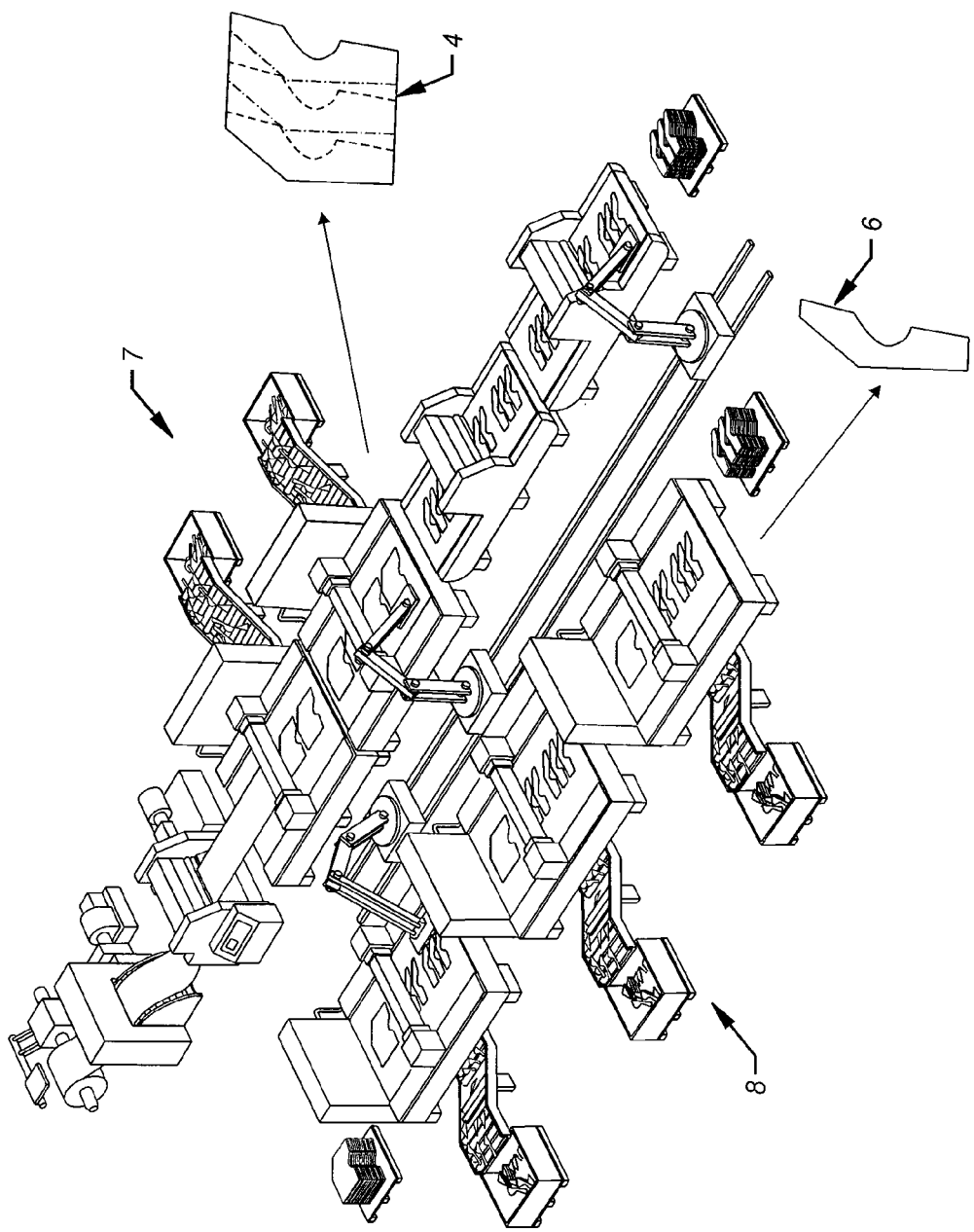
FIG. 9 illustrates an embodiment of a high speed laser blanking installation that can be equipped with the holding apparatus of the present invention.

FIG. 9 represents an embodiment of a high speed laser blanking installation that can be equipped with the apparatus of the present invention. As can be seen, the installation comprises two lines: a first line 7 (or coil-fed station) for detaching the peripheral blanks 4 and a second line 8 (or blank-fed station) for detaching the final individual parts or blank pieces 6 obtained from further cutting of the peripheral blanks 4 obtained with the first line 7.

One laser cutting machine at the first line 7 (coil-fed station) generally can have a cycle time per final individual blank pieces shorter than even press die-blanking. Therefore, for a line balancing cycle time point of view, one does not necessarily need two laser machines at the first line 7 (coil-fed station) unless the number of laser machines at the coil-fed station is very large and demands even shorter cycle times at the coil-fed station. However, it would allow redundancy during downtime for set-up, maintenance and repair of the laser machines. However, using at least two laser machines at the second line 8 (blank-fed station) per one laser cutting machine at the first line 7 (coil-fed station) is a preferable line balancing configuration. A preferred total laser blanking system has one laser cutting machine at the first line 7 (coil-fed station) and up to five (preferably from two to five) laser cutting machines at the second line 8 (blank-fed station) to yield throughputs comparable or superior to that of one press die-blanking line; throughput varies with part configuration and nesting, as well as type of laser resonator and laser machine types, material type and thickness. Note depending upon the actual size of the line and the throughput, greater than five laser cutting machines can be used.

During the cutting operations, the peripheral blank 4 or the final individual part blank pieces 6 to be cut are firmly held by means of an (or several) apparatus according to the present invention equipped with hold down device modules 2 arranged on bridge rail modules 1 that preferably further also comprise pin location modules 5, especially when used in the second line 8 (blank-fed station). In other words, the workpiece 10 is fed from a metal coil to be first cut by a first laser cutting machine of the first line 7 (coil-fed station) into at least one peripheral blank 4 and subsequently the peripheral blank 4 is fed to a second laser cutting machine of the second line 8 (blank-fed station) to be cut into several individual final smaller blank pieces 6. Between the first line 7 (coil-fed station) and the second line 8 (blank-fed station), the peripheral blanks 4 could be temporarily stacked as work-in-process stacks, to be later shipped and processed in a separate second line 8 (blank-fed station).

Each laser machine needs to utilize a maximized "beam-on" value adding time, i.e., the material handling must wait for the laser cutting and not the other way around. For the blank-fed station 8, the laser cutting machines preferably have dual tables, i.e., one side laser cuts while the other side is being loaded/unloaded.

The coil-fed station 7 detaches peripheral blank 4 contours, and if it is laser-cutting, it can make additional cuts, preferably without detaching any offal. This enables balancing the length of cutting between coil-fed stations 7 and blank-fed stations 8. Cutting per each progression of the coil generally takes several seconds, typically from 3 to 4 seconds, thus enabling ample time for material handling to evacuate or stack the detached peripheral blank 4 contours.

By designing with this concept, the coil-fed station 7 preferably does not generate detached offal, and therefore is not potentially hampered or slowed down by the time needed to evacuate offal. The coil support system during cutting is then simplified for the laser machines of the coil-fed station 7.

The holding apparatus of the present invention may further comprise motion mechanisms for moving a plate to be cut along the X-axis.

Further, the apparatus of the present invention may also comprise other well-known elements used for laser cutting, such as any one or more of the following:
 laser generator for generating a laser beam, like a fiber laser generator,
 laser cutting head that is used for cutting the workpieces,
 gas source, such as a gas conduit and/or a gas cylinder or storage vessel, for containing and feeding an assist gas or gas mixture to the laser head that is used for assisting said laser beam during cutting,
 device for moving the laser cutting head with respect to the workpiece so as to operate a cutting along the desired trajectory(ies),
 a control device, such as a CNC or similar, for piloting the laser head,
 any other element that is used in laser cutting.

Elements included in the Figures:
1—bridge rail modules
2—hold down device modules
3—reference locator features
4—peripheral blank
5—pin location modules
6—blank pieces
7—first line (coil-fed station)
8—second line (blank-fed station)
9—grids
10—metal plate (coil) (also referred to as workpiece)
11—cutting line
11'—previous cutting line
12—path of cutting
13—table frame
14—laser cutting head

What is claimed is:

1. A holding apparatus for laser cutting a workpiece, the holding apparatus comprising:
 a rigid support table frame having a work surface envelop, an X-axis and an Y-axis, and
 one or more bridge rail modules spanning at least partially across the work surface envelope of the table frame, each bridge rail module comprising at least one hold-down device module,
 wherein the at least one hold-down device module is a device that can be actuated to exert a magnetic force to hold down the workpiece directly if the workpiece is made at least partially of magnetic material or indirectly if the workpiece is not made at least partially of magnetic material.

2. The apparatus of claim 1, wherein the X-axis and Y-axis position of each bridge rail modules is adjustable.

3. The apparatus of claim 1, wherein the at least one hold-down device module is a hold-down device module which is in fluid connection with at least a vacuum source or a venture effect source.

4. The apparatus of claim 1, wherein the position of each hold-down device module on the bridge rail module is adjustable before and after the cutting of the workpiece.

5. The apparatus of claim 1, wherein the position of each hold-down device module on the bridge rail module is firmly secured during cutting according to a pattern optimized based on each cutting nesting pattern.

6. The apparatus of claim 1, wherein the apparatus further comprises at least one laser cutting head.

7. The apparatus of claim 6, wherein the position of each hold-down device module on the bridge rail module is firmly secured during cutting according to a pattern optimized based on each cutting nesting pattern, such that the hold down device modules are not along the path of the laser-cutting head during cutting.

8. The apparatus of claim 1, wherein the position of each hold-down device module on the bridge rail module can be moved during cutting, such that the hold-down device modules and the laser-cutting head will not be at the same position at the same time during cutting.

9. The apparatus of claim 1, wherein one or more bridge rail modules comprise at least one pin location module.

10. The apparatus of claim 9, wherein at least one pin location module includes a pin.

11. The apparatus of claim 1, wherein when more than one bridge rail module is present, the bridge rail modules are parallel to one another.

12. The apparatus of claim 1, wherein at least one of the bridge rail modules spans in size across at least a portion of the entire table frame surface envelope.

13. The apparatus of claim 1, wherein at least one of the bridge rail modules is anchored securely on at least one edge of the table frame.

14. The apparatus of claim 1, wherein at least one of said bridge rail modules is anchored securely on at least two edges of the table frame.

15. The apparatus of claim 1, wherein the apparatus further comprises a motion mechanism for moving the workpiece to be cut along the X-axis of the rigid support table frame.

16. The apparatus of claim 1, wherein the rigid support table frame presents the surface of the substantially flat workpiece to be cut in a non-horizontal position during cutting.

17. The apparatus of claim 1, wherein the support table frame presents the surface of the substantially flat workpiece to be cut in a vertical position during cutting.

18. A process for laser cutting a metal plate, comprising
   a) providing a laser cutting device,
   b) providing a metal plate to be cut,
   c) providing a laser cutting holding apparatus comprising a rigid support table frame having an X-axis and an Y-axis and one or more bridge rail modules running across the Y-axis of the table frame, each bridge rail module comprising at least one hold-down device module that can be actuated to exert a magnetic force to hold down the workpiece directly if the workpiece is made at least partially of magnetic material or indirectly if the workpiece is not made at least partially of magnetic material and maintaining the metal plate,
   d) cutting the metal plate by means of a laser beam delivered by the laser cutting device while the metal plate is held and maintained in position by one or more bridge rail modules of the apparatus, each bridge rail module having at least one hold-down device module.

19. The process of claim 18, wherein the metal plate is a metal coil.

20. The process of claim 18, wherein the metal plate is cut in one master blank or in several blank pieces.

21. The process of claim 20, wherein the metal plate is fed from a metal coil to be first cut by a first cutting machine into at least one peripheral blank and subsequently the peripheral blank is fed to a second cutting machine to be cut into several individual final smaller blank pieces.

22. The process of claim 18, wherein the laser is a fiber laser type.

23. The process of claim 18, wherein the laser is a $CO_2$ laser type.

24. The process of claim 18, wherein the laser is a disk laser type.

* * * * *